United States Patent
Chang et al.

(10) Patent No.: US 10,691,257 B2
(45) Date of Patent: Jun. 23, 2020

(54) METHOD OF CHANGING IDENTIFIED TYPE OF TOUCHING OBJECT

(71) Applicant: ELAN MICROELECTRONICS CORPORATION, HsinChu (TW)

(72) Inventors: Tuan-Ying Chang, Tainan (TW); Hsueh-Wei Yang, Hsinchu County (TW); Pin-Jung Chung, Taoyuan (TW)

(73) Assignee: ELAN MICROELECTRONICS CORPORATION, HsinChu (TW)

( * ) Notice: Subject to any disclaimer, the term of this patent is extended or adjusted under 35 U.S.C. 154(b) by 0 days.

(21) Appl. No.: 16/508,256

(22) Filed: Jul. 10, 2019

(65) Prior Publication Data

US 2020/0026407 A1 Jan. 23, 2020

(30) Foreign Application Priority Data

Jul. 18, 2018 (TW) .............................. 107124794 A

(51) Int. Cl.
*G06F 3/041* (2006.01)
*G06F 3/0354* (2013.01)
(52) U.S. Cl.
CPC ...... *G06F 3/04166* (2019.05); *G06F 3/03547* (2013.01)
(58) Field of Classification Search
CPC .......................... G06F 3/03547; G06F 3/04166
See application file for complete search history.

(56) References Cited

U.S. PATENT DOCUMENTS

| 9,041,663 | B2 * | 5/2015 | Westerman | G06F 3/041 345/173 |
| 2006/0044259 | A1 * | 3/2006 | Hotelling | G06F 1/1616 345/156 |
| 2009/0095540 | A1 * | 4/2009 | Zachut | G06F 3/0418 178/18.03 |
| 2009/0244092 | A1 * | 10/2009 | Hotelling | G06F 3/0304 345/619 |
| 2011/0291922 | A1 * | 12/2011 | Stewart | G06F 3/03547 345/156 |
| 2012/0182238 | A1 * | 7/2012 | Lee | G06F 3/0416 345/173 |
| 2012/0293454 | A1 * | 11/2012 | Tsai | G06F 3/0418 345/174 |

(Continued)

FOREIGN PATENT DOCUMENTS

| CN | 101957694 A | 1/2011 |
| CN | 106155642 A | 11/2016 |

(Continued)

*Primary Examiner* — Amare Mengistu
*Assistant Examiner* — Crystal Mathews
(74) *Attorney, Agent, or Firm* — Winston Hsu

(57) ABSTRACT

A method of changing the identified type of a touching object is provided. The touching object is on a touch pad. The method includes the following steps: (A) when the type of the touching object is determined as a palm, determining the type of the touching object again; (B) when the type of the touching object is determined as a finger in step (A), informing the operating system that the touching object has left the touch pad when the touching object does not leave the touch pad; and (C) after step (B) is done, informing the operating system that the type of the touching object is a finger.

10 Claims, 2 Drawing Sheets

(56) References Cited

U.S. PATENT DOCUMENTS

| | | | | |
|---|---|---|---|---|
| 2013/0300672 A1* | 11/2013 | Griffin | ................ | G06F 3/04883 |
| | | | | 345/173 |
| 2013/0300696 A1* | 11/2013 | Haran | .................... | G06F 3/041 |
| | | | | 345/173 |
| 2014/0022193 A1* | 1/2014 | Kim | ........................ | G06F 3/044 |
| | | | | 345/173 |
| 2014/0191983 A1* | 7/2014 | Choi | .................... | G06F 3/0412 |
| | | | | 345/173 |
| 2015/0177870 A1* | 6/2015 | Nicholson | ............. | G06F 3/0418 |
| | | | | 345/174 |
| 2017/0097733 A1* | 4/2017 | Edgar | ................... | G06F 3/0418 |
| 2018/0164910 A1* | 6/2018 | Ent | ........................ | G06F 1/1618 |
| 2020/0026407 A1* | 1/2020 | Chang | ................ | G06F 3/03547 |

FOREIGN PATENT DOCUMENTS

| | | |
|---|---|---|
| TW | 201423558 A | 6/2014 |
| TW | 201604766 A | 2/2016 |
| TW | 201737142 A | 10/2017 |

\* cited by examiner

METHOD OF CHANGING IDENTIFIED TYPE OF TOUCHING OBJECT

BACKGROUND OF THE INVENTION

1. Field of the Invention

The present invention relates to a touch pad, and more particularly, to a method of changing an identified type of a touching object on the touch pad.

2. Description of the Prior Art

Touch pads are widely used in laptop computers to control the cursor on the screen. The controller for the touch pad can identify the touching object on the touch pad. When the touching object is identified as a finger, the touching object may perform operation such as cursor control, click or other gesture operations. When the touching object is identified as a palm, the contact of the touching object is determined as an unintentional contact, thus the touching object could not perform input functions on the touch pad. Therefore, if the touching object is a finger but incorrectly identified as a palm by the controller, it may cause great inconvenience to users.

SUMMARY OF THE INVENTION

Therefore, an object of the present invention is to provide a method of changing an identified type of a touching object and an associated controller, to improve the above issue in the prior art.

At least one embodiment of the present invention provides a method of changing an identified type of a touching object. The touching object is located on a touch pad. The method comprises following steps: (A) when the type of the touching object is determined as a palm, determining the type of the touching object again; (B) when the type of the touching object is determined as a finger in step (A), informing the operating system that the touching object has left the touch pad when the touching object does not leave the touch pad; and (C) after step (B) is performed, informing the operating system that the type of the touching object is a finger.

At least one embodiment of the present invention provides a controller which is coupled to detect a touch pad in a computer system. The computer system comprises an operating system. The controller comprises a storage medium for storing multiple instructions, and a processor for executing the multiple instructions to perform following steps: (A) when the type of a touching object on the touch pad is determined as a palm, determining the type of the touching object again; (B) when the type of the touching object is determined as a finger in step (A), informing the operating system that the touching object has left the touch pad when the touching object does not leave the touch pad; and (C): after step (B) is performed, informing the operating system that the type of the touching object is the finger.

One of the advantages provided by the present invention is that the operating experience on touch pads can be greatly improved for users.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
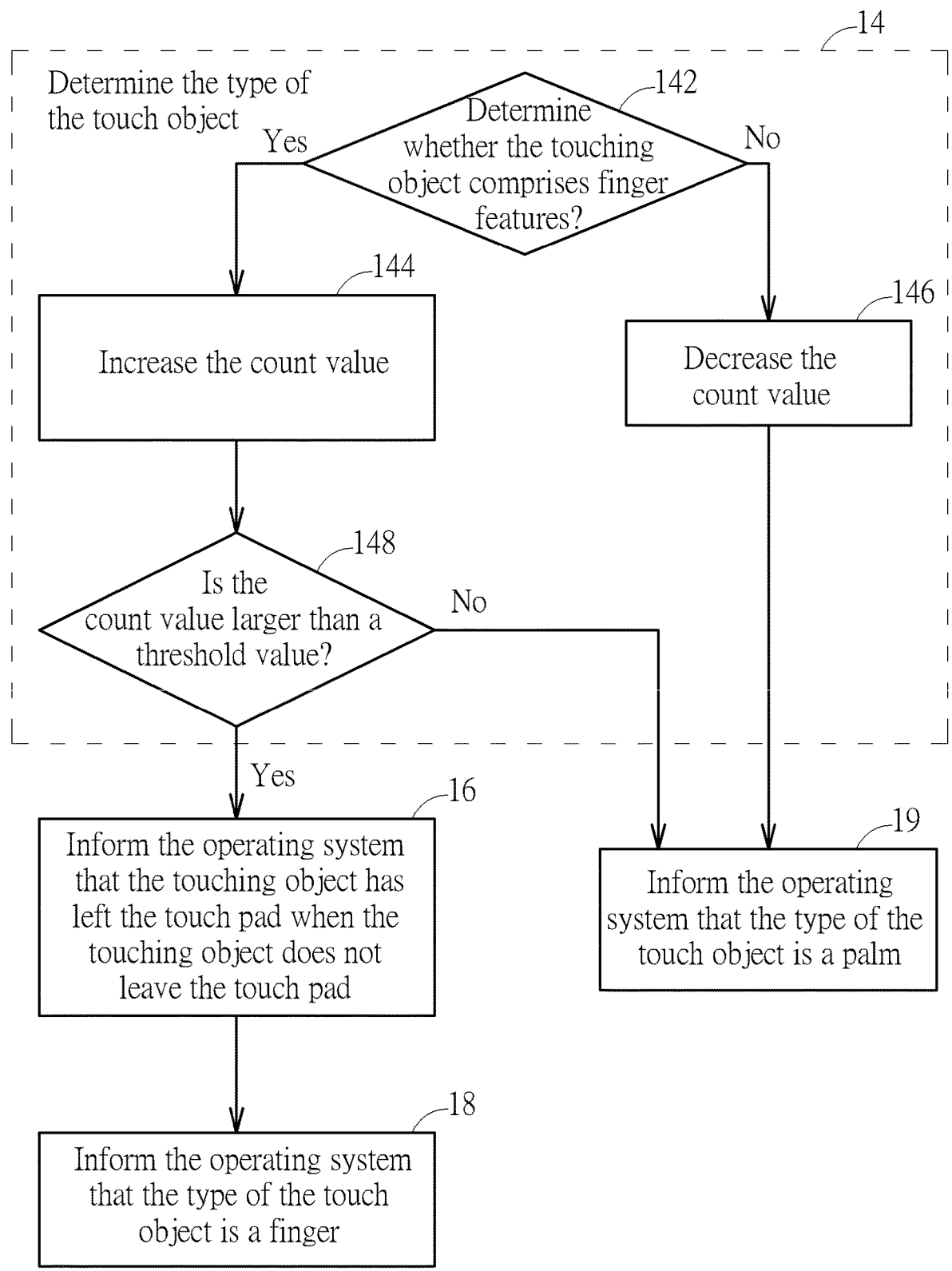
FIG. 1 is a flowchart illustrating a method of changing an identified type of a touching object according to an embodiment of the present invention.

The present invention provides a method of changing the identified type of a touching object which is on a touch pad. The identified type of the touching object is reported to an operating system (OS) of a host. The host can be, for example, a smartphone, tablet, laptop computer, desktop computer, and so on. The operating system may be, for example, Microsoft windows operating system, which supports the Precision Touchpad Protocol (PTP). The method and flow described in following descriptions can be implemented by software and/or firmware. For example, the method of present invention may be implemented with firmware of a controller for a touch pad, or driver for the touch pad. Any method or means that utilize the same invention concept should fall in the scope of the present invention.

In an embodiment, the controller for the touch pad reports contact information of the touch pad to the operating system every predetermined period. Based on the PTP, the contact information comprises parameters listed in the table below:

| Parameters | Meaning |
| --- | --- |
| Contact ID | Represent the number of the touching object. |
| X | X-axis coordinate of the touched location. |
| Y | Y-axis coordinate of the touched location. |
| Tip | Represent the touch state. If the touch pad is touched, Tip = 1; otherwise, Tip = 0. |
| Confidence | Represent the type of the touching object. If the touching object is a palm, Confidence = 0; if the touching object is a finger, Confidence = 1. |

The operating system refers to the Confidence value in the contact information to determine the type of the touching object. If the value of Confidence is 1, it means the type of the touching object is a finger, and the contact made by the touching object is not an unintentional contact, thus the operating system accepts the input made by the touching object on the touch pad. On the other hand, if the value of Confidence is 0, it means that the type of the touching object is a palm and the operating system regards the contact made by the touching object as an unintentional contact, thus the input made by the touching object is ignored. Based on the PTP specification of Microsoft, if the type of a touching object is determined as a palm, the operating system will always regard the touching object as a palm before the touching object leaves the touch pad. Hence, if a user's finger which is touching the touch pad is wrongly determined as a palm, this wrong determination cannot be corrected immediately based on the PTP. More specifically, the operating system will always regard the finger as a palm, making the finger unable to perform any touch input on the touch pad. This limitation causes great inconveniences to the user. If the user wishes to perform input operations on the touch pad, the user's finger must leave the touch pad and then contacts the touch pad again. By this way, the controller for the touch pad may re-determine the type of the touching object again. After the type of the touching object is determined as a finger, this information will be informed to the operating system, so that the user is able to perform input operations on the touch pad.

Since there are various public methods for determining a type of a touching object, such as the US patent application with a publication number of US 20160054831, the detailed descriptions of how to determine a type of a touching object are omitted here for brevity.

Please refer to FIG. 1, which is a flowchart illustrating a method of changing an identified type of a touching object according to the present invention. The detailed descriptions are as follows.

Step 14: Determine the type of the touching object.

Step 16: Inform the operating system that the touching object has left the touch pad when the touching object does not leave the touch pad.

Step 18: Inform the operating system that the type of the touching object is a finger.

Step 19: Inform the operating system that the type of the touching object is a palm.

The above method of FIG. 1 describes the operations in a case that the type of the touching object is determined as a palm. In an embodiment, the controller for the touch pad stores the Confidence value of the contact information sent to the operating system. By checking this stored Confidence value, the controller for the touch pad may know whether the type of the touching object is currently determined as a palm or a finger.

When the type of the touching object is determined as a palm, the flow goes to Step 14 to determine the type of the touching object again. When Step 14 determines that the type of the touching object is a finger, it means that the previous determining result of the type of the touching object is incorrect, or the state of the touching object contacting the touch pad has changed, such as changing from the state a finger is flatly placed on a touch pad to the state the finger is erected on the touch pad. Comparatively, the flatly placed finger has a larger contact area on the touch pad than the erected finger. A larger contact area may generally be regarded as an unintentional touch. Hence, in most cases, the controller for the touch pad might determine a flatly-placed finger as a palm.

After the type of the touching object is determined as a finger in Step 14, the flow goes to Step 16 which informs the operating system that the touching object has left the touch pad. Please note that the touching object does not actually leave the touch pad during the entire process. The purpose of Step 16 is to make the operating system believe the touching object has left the touch pad. For example, Contact ID of the touching object may be 1. In Step 16, the controller for the touch pad sets the Tip value in the contact information sent to the operating system as 0. Therefore, according to "Contact ID=1 and Tip=0" provided in the contact information, the operating system may determine that the touching object has left the touch pad.

After Step 16 is finished, the Step 18 is performed to inform the operating system that the type of the touching object is a finger. In an embodiment of Step 18, the controller for the touch pad sends contact information to the operating system. In this contact information, the Confidence value is 1, and the Tip value is 1. According to the contact information, the operating system now determines the touching object, which is previously determined as a palm, as a new touching object, and determines the type of the touching object as a finger.

Figure 2:
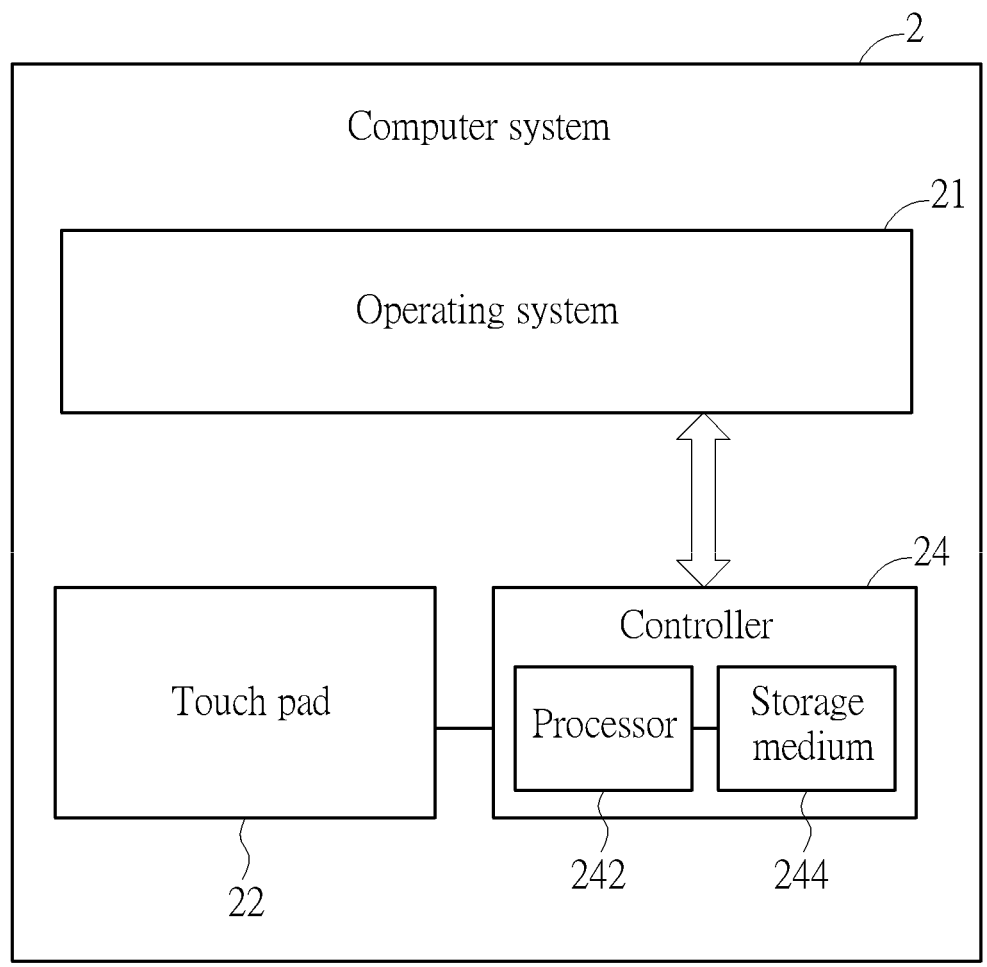
FIG. 2 is a diagram illustrating a computer system according to an embodiment of the present invention.

Steps 16 and 18 follows the PTP. In the flow of FIG. 2, the touching object never actually leaves the touch pad. The purpose of the present invention is to make the operating system believe that the touching object has left the touch pad, and the touch pad is contacted by another new touching object, and the type of the new touching object is a finger. After the operating system determines the type of the touching object as a finger, the touching object (e.g. the user's finger) may perform input operations on the touch pad, without the need for actually leaving the touch pad. It is more convenient to user.

In one embodiment, Step 14 may further comprise following steps:

Step 142: Determine whether the touching object comprises one or more finger features. If yes, the flow goes to Step 144; otherwise, the flow goes to Step 146.

Step 144: Increase the count value.

Step 146: Decrease the count value.

Step 148: Determine whether the count value is larger than a threshold value. If yes, the flow goes to Step 16; otherwise, the flow goes to Step 19.

In an embodiment, the initial value of the count value is 0, and the threshold value is 9. When Step 142 determines that the touching object comprises one or more finger features, Step 144 will be performed to add 1 to the count value; otherwise, Step 146 will be performed to subtract 1 from the count value. Step 148 further compares the count value with the threshold value. When the count value is larger than the threshold value, it is certain that the touching object is a finger, and Step 16 will be performed next. Otherwise, Step 19 will be performed next to keep Confidence value as 0 and to inform the operating system that the touching object is a palm. After Step 19, Step 14 is performed again with the adjusted count value to continuously confirm the type of the touching object. When the type of the touching object is determined as a finger in Step 14, the count value is reset to the initial value 0. As stated in FIG. 1, the type of the touching object is determined as a finger only when the touching object is determined as having one or more finger features for a plurality of times. Such mechanism may help reduce the possibility of wrong determination.

Steps 144 and 146 refer to the determining result of Step 142 to adjust the count value. In other embodiments, the initial value may be set as 11, and the threshold value may be 1. When Step 142 determines that the touching object comprises one or more finger features, the count value is subtracted by 1; otherwise, the count value is added by 1. When the count value is smaller than the threshold value, the flow goes to Step 16; otherwise, the flow goes to Step 19.

Step 142 is applied to identify whether the type of the touching object is possibly a finger. There are various ways to implement Step 142. For example, the US patent application with the No. US 20160054831 discloses that a method of determining whether the touching object comprises a finger feature comprises obtaining the sizes of a contact area and a hover area of the touching object on the touch pad, and determining the touching object as a finger if the ratio of the hover area to the contact area is smaller than a predetermined ratio. In other words, this related art technique determines the type of the touching object by referring to the ratio of the hover area to contact area of the touching object. When the ratio is smaller than a predetermined ratio, the touching object is determined as having a finger feature.

In this related art technique, the hover area represents the area where the object is located nearby without physically touching the touch pad. In general, the ratio of hover area to the contact area of a finger is smaller than that of a palm. Hence, the ratio of the hover area to the contact area of an object can be used to identify the type of the object.

In another embodiment of Step 142, the method of determining whether the touching object comprises one or more finger features may comprise obtaining the contact area of the touching object on the touch pad, and then determining whether the contact area is smaller than an area threshold. In this example, the contact area of the touching object is compared with an area threshold. When the contact area is smaller than the area threshold, the touching object is determined as comprising one or more finger features. In general, the contact area between the palm and the touch pad is larger. Based on this concept, the contact area of an object may be used to identify the type of the object.

In another embodiment, methods of determining whether the touching object comprises one or more finger features may comprise obtaining a moving distance of the touching object, and determine whether the moving distance is larger than a predetermined distance. In this embodiment, the moving distance of the touching object is compared with a predetermined distance. When the moving distance is larger than the predetermined distance, the touching object is determined to comprise one or more finger features. In general, the contact of the palm on the touch pad is an unintentional contact, thus such contact always has no obvious movement. On the contrary, using a finger to perform cursor controls may generate a movement with a larger moving distance. Hence, a moving distance of an object may be used to identify the type of the object.

In the above embodiment(s) of the present invention, various steps are executed by the controller for the touch pad. However, in other embodiments, part or all of each step mentioned in the present invention may also be implemented by the controller for the touch pad, the driver for the touch pad or other application programs.

As illustrated above, based on the present invention, the method of changing the identified type of the touching object may be briefed as the following steps.
(A) When the type of the touching object is determined as a palm, determine the type of the touching object again;
(B) When the type of the touching object is determined as a finger in the step (A), inform the operating system that the touching object has left the touch pad when the touching object does not leave the touch pad; and
(C) After the step (B) is performed, inform the operating system that the type of the touching object is a finger.

FIG. 2 is a schematic diagram illustrating a computer system 2 according to an embodiment of the present invention. The computer system 2 adopts the method shown in FIG. 1. The computer system 2 comprises an operating system 21, a touch pad 22, and a controller 24. The touch pad 22 is arranged to receive inputs from an object (e.g. a finger or a palm). The controller 24 is coupled to the touch pad 22. The controller 24 is arranged to detect the touch pad 22 and report the touch information (e.g. the number of touching objects, types of touching objects, etc.) obtained by detecting the touch pad 22 to the operating system. In this embodiment, the controller 24 is arranged to execute each step shown in FIG. 1. The controller 24 comprises a processor 242 and a storage medium 244. The storage medium 244 may be a read-only memory (ROM) or flash memory. The storage medium 244 stores multiple instructions for execution by the processor 242. The multiple instructions are used to respectively achieve Step 14, 16, 18 and 19 shown in FIG. 1. Via executing the multiple instructions by the processor 242, the controller 24 may perform each step shown in FIG. 1

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of changing an identified type of a touching object located on a touch pad, the method comprising following steps:
   (A) when the type of the touching object is determined as a palm, determining the type of the touching object again;
   (B) when the type of the touching object is determined as a finger in the step (A), informing the operating system that the touching object has left the touch pad when the touching object does not leave the touch pad; and
   (C) after the step (B) is performed, informing the operating system that the type of the touching object is a finger.

2. The method of claim 1, wherein the step (A) comprises following steps:
   (A1) determining whether the touching object comprises one or more finger features:
   (A2) adjusting a count value after determining that the touching object has the finger feature in the step (A); and
   (A3) after the step (A2) is performed, comparing the count value with a threshold value.

3. The method of claim 2, wherein the step (A1) comprises:
   obtaining a contact area of the touching object on the touch pad;
   determining that the contact area is smaller than an area threshold; and
   after the step of determining that the contact area is smaller than the area threshold, performing the step (A2).

4. The method of claim 2, wherein the step (A1) comprises:
   obtaining a contact area and a hover area of the touching object;
   determining that a ratio of the hover area to the contact area is smaller than a predetermined ratio; and
   after the step of determining that the ratio of the hover area to the contact area is smaller than the predetermined ratio, performing the step (A2).

5. The method of claim 2, wherein the step (A1) comprises:
   obtaining a moving distance of the touching object;
   determining that the moving distance is larger than a predetermined distance; and
   after the step of determining that the moving distance is larger than a predetermined distance, performing the step (A2).

6. A controller, coupled to a touch pad in a computer system with an operating system, comprising:
   a storage medium, storing multiple commands; and
   a processor, arranged to execute the multiple commands to make the controller perform following steps:
   (A) determining the type of the touching object again when the type of a touching object on the touch pad is determined as a palm;

(B) when the type of the touching object is determined as a finger in the step (A), informing the operating system that the touching object has left the touch pad when touching object does not leave the touch pad; and (C) after the step (B) is performed, informing the operating system that the type of the touching object is the finger.

7. The controller of claim 6, wherein the step (A) comprises following steps:

(A1) determining whether the touching object comprises one or more finger features:

(A2) adjusting a count value after determining that the touching object comprises one or more finger features in the step (A1); and (A3) after the step (A2) is performed, comparing the count value and a threshold value.

8. The controller of claim 7, wherein the step (A1) comprises:

obtaining a contact area of the touching object on the touch pad;

determining that the contact area is smaller than an area threshold; and after the step of determining that the contact area is smaller than the area threshold, performing the step (A2).

9. The controller of claim 7, wherein the step (A1) comprises:

obtaining a contact area and a hover area of the touching object;

determining that the ratio of the hover area to the contact area is smaller than a predetermined ratio; and after the step of determining that the ratio of the hover area to the contact area is smaller than a predetermined ratio, performing the step (A2).

10. The controller of claim 7, wherein the step (A1) comprises:

obtaining a moving distance of the touching object;

determining that the moving distance is longer than a predetermined distance; and after the step of determining that the moving distance is longer than the predetermined distance, performing the step (A2).

* * * * *